US008605588B2

(12) United States Patent
Sankaran et al.

(10) Patent No.: US 8,605,588 B2
(45) Date of Patent: *Dec. 10, 2013

(54) PACKET DROP ANALYSIS FOR FLOWS OF DATA (75) Inventors: Ganesh Chennimalai Sankaran, Tamil Nadu (IN); Dinesh Sivaraj, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 623 days.

This patent is subject to a terminal disclaimer.

(21) Appl. No.: 11/745,763

(22) Filed: May 8, 2007

(65) Prior Publication Data

US 2008/0279102 A1    Nov. 13, 2008

(51) Int. Cl.
*H04J 1/16* (2006.01)
(52) U.S. Cl.
USPC .......................................................... 370/235
(58) Field of Classification Search
USPC ......................................... 370/232, 242, 252
See application file for complete search history.

(56) References Cited

U.S. PATENT DOCUMENTS

| | | | |
|---|---|---|---|
| 6,243,667 B1 | 6/2001 | Kerr et al. | |
| 6,308,148 B1 | 10/2001 | Bruins et al. | |
| 6,757,248 B1 * | 6/2004 | Li et al. | 370/235 |
| 6,889,181 B2 | 5/2005 | Kerr et al. | |
| 6,934,256 B1 * | 8/2005 | Jacobson et al. | 370/235 |
| 2002/0091636 A1 * | 7/2002 | Carroll Bullard | 705/40 |
| 2007/0002745 A1 * | 1/2007 | Ossman et al. | 370/235 |
| 2007/0157312 A1 * | 7/2007 | Joubert et al. | 726/22 |
| 2008/0037443 A1 * | 2/2008 | Ansari et al. | 370/254 |
| 2010/0205608 A1 * | 8/2010 | Nemirovsky et al. | 718/104 |

OTHER PUBLICATIONS

"Packet Sampling (psamp)", Aquired at: http://www.ietf.org/html.charters/psamp-charter.html, 4 pages.
Nick Duffield, "A Framework for Packet Selection and Reporting", Aquired at: http://tools.ietf.org/html/draft-ietf-psamp-framework-08, 33 pages, Sep. 2004.
T. Zseby, et al., "Sampling and Filtering Techniques for IP Packet Selection", Aquired at: http://tools.ietf.org/html/draft-ietf-psamp-sample-tech-07.txt, 38 pages, Jul. 2005.

(Continued)

*Primary Examiner* — Marcus R Smith
*Assistant Examiner* — Omeed D Rahgozar
(74) *Attorney, Agent, or Firm* — Fish & Richardson P.C.

(57) ABSTRACT

In one embodiment, a method includes determining that a packet has been dropped for a flow of packets between a source and destination. This may be determined at a network device that is forwarding the packets. Information related to a possible cause for the packet being dropped is then determined. For example, a context as to why the packet is dropped may be determined. The context is then associated with information for the flow and is useful to perform a packet drop analysis for the flow. For example, a source and destination for the flow is recorded along with the possible cause of the packet drop. This information may be stored and sent to an aggregation device. The aggregation device may then analyze the entry, possibly along with other entries from this network device or other network devices, and determine any troubleshooting information for the packet drops.

16 Claims, 4 Drawing Sheets

(56) References Cited

OTHER PUBLICATIONS

T. Dietz, Ed., et al., "Definitions of Managed Objects for Packet Sampling", Network Working Group, Aquired at: http://tools.ietf.org/html/draft-ietf-psamp-mib-06.txt, 46 pages, Jun. 23, 2006.

B. Claise, "Packet Sampling (PSAMP) Protocol Specifications", PSAMP working group, Aquired at: http://tools.ietf.org/html/draft-ietf-psamp-protocol-05.txt, 43 pages, Mar. 2006.

T. Dietz, et al.,"Information Model for Packet Sampling Exports", Network Working Group, Aquired at: http://tools.ietf.org/html/draft-ietf-psamp-info-04.txt, 36 pages, Mar. 6, 2006.

* cited by examiner

PACKET DROP ANALYSIS FOR FLOWS OF DATA

TECHNICAL FIELD

Particular embodiments generally relate to networking.

BACKGROUND

Packet drops may occur while forwarding packets in a network for many reasons. A network device may maintain a general packet drop counter that counts the number of packets it drops. This is a general count for the entire network device. The network device may be servicing many different flows, each of which may be dropping packets. The general packet counter may give insight that the network device may be experiencing problems in forwarding packets; however, it is difficult to determine the reason why the network device is dropping packets. This may impede any troubleshooting in determining how to improve the packet drop rate.

DESCRIPTION OF EXAMPLE EMBODIMENTS

Overview

In one embodiment, a method includes determining that a packet has been dropped for a flow of packets between a source and destination. This may be determined at a network device that is forwarding the packets. Information related to a possible cause for the packet being dropped is then determined. For example, a context as to why the packet is dropped may be determined, such as buffers may be full, policy and compliance reasons, etc. The context is then associated with information for the flow and is useful to perform a packet drop analysis for the flow. For example, a source and destination for the flow is recorded along with the possible cause of the packet drop. This information may be stored and sent to an aggregation device. The aggregation device may then analyze the entry, possibly along with other entries from this network device or other network devices, and determine any troubleshooting information for the packet drops.

Example Embodiments

Figure 1:
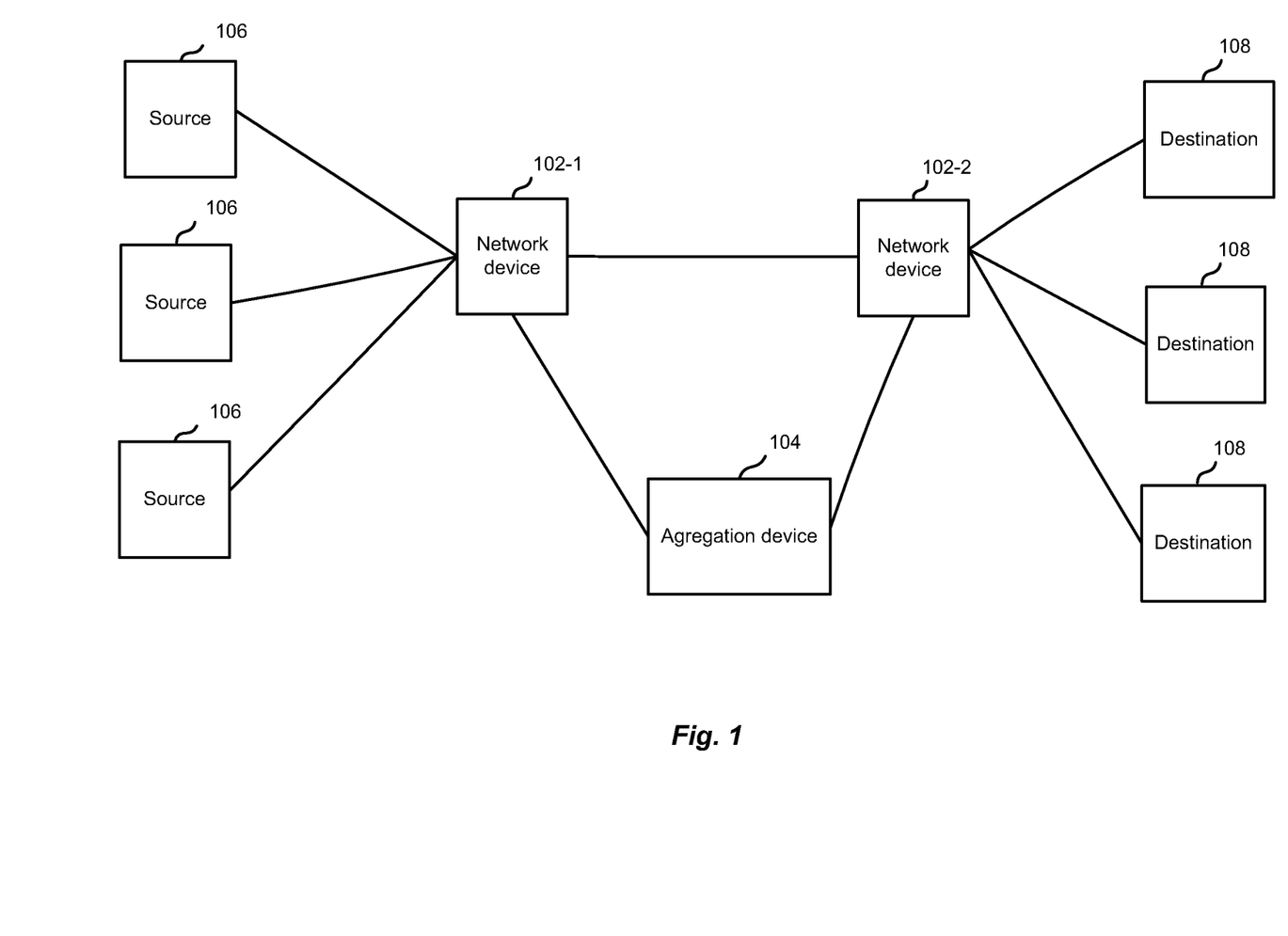
FIG. 1 depicts an example of a system for analyzing packet drops.

FIG. 1 depicts an example of a system for analyzing packet drops. As shown, a plurality of network devices 102, an aggregation device 104, a plurality of sources 106, and a plurality of destinations 108 are provided. Network devices 102 may be forwarding packets from sources 106 to destinations 108.

Network devices 102 may be any devices configured to forward packets. For example, network devices 102 may include routers, switches, etc. Although the term "route" or "forward" may be used, it will be understood that any receiving and sending of packets may be provided by network device 102. For example, a switch may receive a packet and send it at layer 2.

Sources 106 may be any devices that are sending packets. For example, sources 106 may be end points that originate the sending of data. Further, sources 106 may be other network devices, such as routers, switches, aggregation points, gateways, etc.

Destinations 108 may be any devices configured to receive the packets. For example, destinations 108 may be end points, gateways, switches, routers, etc.

Sources 106 and destinations 108 may include identifying information. For example, a source IP address and source port may be associated with source 106 and destination 108 may include a destination IP address and destination port. A flow may be any connection between a source 106 and a destination 108 that routes data between the two. For example, the flow may include a source IP address, destination IP address, a source port, and a destination port. In this flow, data may be sent between source 106 and destination 108.

Network device 102 is configured to determine when packets are dropped. When the packets are dropped, network device 102 may determine a context for the packet drop. This may include a reason as to why the packet may have been dropped. Network device 102 then records an entry for the flow in which a packet was dropped. For example, the source IP address, destination IP address, source port, and destination port may be recorded in an entry. Further, a reason for the possible cause of the packet drop may also be recorded in the entry. These entries may be stored for each flow being serviced by network device 102. Although this information is described as being stored, it will be understood that other information may be stored.

In one embodiment, each network device 102 may maintain its own packet drop entries. At certain points, network devices 102 send the packet drop entries to aggregation device 104. Aggregation device 104 is then configured to analyze the packet drop entries. In one case, aggregation device 104 may determine troubleshooting information for the packet drops. For example, the information may be used to take actions on rectifying problems causing the packet drops.

Figure 2:
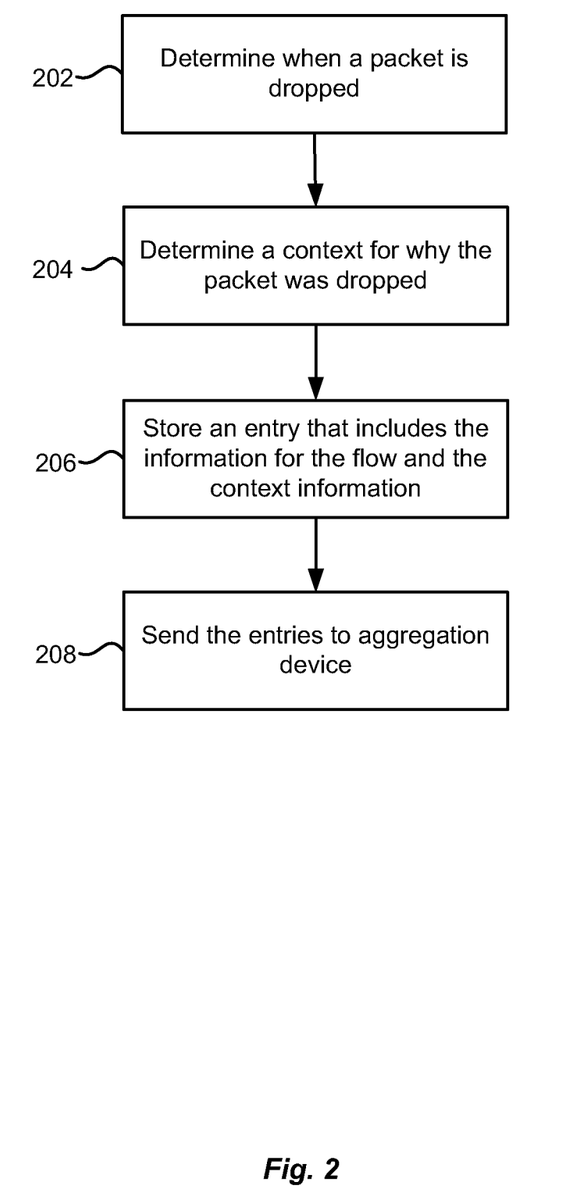
FIG. 2 depicts an example of a method for determining packet drop information.

FIG. 2 depicts an example of a method for determining packet drop information. Step 202 determines when a packet is dropped. The packet drops may occur at any network devices 102. Network devices 102 may be intermediate nodes in a network that are forwarding packets from sources 106 to destinations 108.

Packet drops at various network devices 102 may decrease network reliability. There may be different reasons why packets may be dropped. For example, network device 102 may not possess enough resources to receive or re-send the packet. The resources may either be internal resources, such as memory or CPU, or they could be external resources, such as bandwidth. Also, network device 102 may determine that the packet received violates a policy configured on it. For example, data in the packet may violate a policy that does not allow sending of a packet and thus the packet is dropped. Also, protocol definitions may include some rules that were not satisfied, which causes packets to be dropped. For example, in carrier sense multiple access/collision detection (CSMA/CD), which is used in Ethernet, does not attempt to resend packets even when a late collision is detected. Also, time to live (TTL), when exceeded in transit, can also be considered as a protocol limitation. Packets may also be dropped during a control plane protocol reconvergence, such as a spanning tree convergence that blocks all packets.

Step 204 determines a context for why the packet was dropped. Conventionally, although some network devices may increment a global drop counter, these network devices do not store any information on the context of where and why the packets were dropped. Thus, it is difficult to relate the increase in a particular drop counter to actual reasons why there was an increase.

Network device 102 may determine end-to-end information that may be useful in debugging the packet drop problem. For example, if a particular packet is dropped at a layer 2 switch, it can record information, such as a source IP address, destination IP address, source port, and destination port. Other information may also be appreciated.

Also, network device 102 may record a reason why the packet may be dropped. Some reasons may include categories as follows:
1. Buffer Full Conditions
   input full
   output full
   shared buffer full
2. Policy Incompliance
   QoS policing incompliance
3. Queue Full Drops
4. Protocol Incompliance
   TTL exceeded
   late collision
   Other reasons may also be appreciated.

Step 206 stores an entry that includes the information for the flow and the context information. In one embodiment, the entries may be buffered and sent to aggregation network device 104 at certain intervals. For example, the information may be exported daily to aggregation device 104. Also, once a threshold is reached in storage capacity, the entries may be exported to free up storage or buffer space.

Step 208 then sends the entries to aggregation device 104. Aggregation device 104 may thus receive entries for packet drops from all network devices 102.

Figure 3:
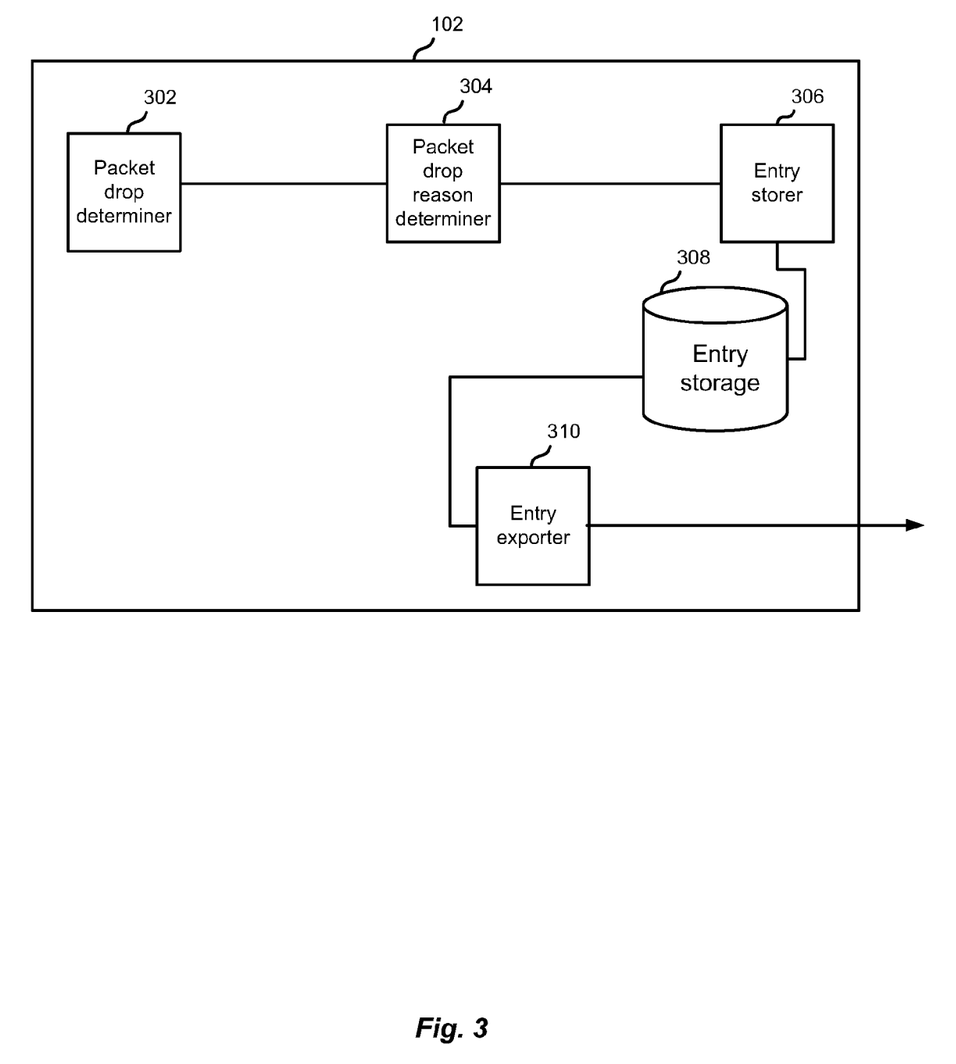
FIG. 3 depicts a more detailed example of a network device.

FIG. 3 depicts a more detailed example of network device 102. As shown, network device 102 includes a packet drop determiner 302, a packet drop reason determiner 304, an entry storer 306, entry storage 308, and an entry exporter 310.

Packet drop determiner 302 is configured to determine when a packet drop occurs. The packet drop may be determined at any layers, such as at layer 2, layer 3, etc.

Packet drop reason determiner 304 is configured to determine a reason for a drop. Any of the reasons enumerated above may be used. Packet drop determiner 304 may not monitor all flows that are currently being serviced. For example, only critical flows or ones that are being troubleshooted may be monitored. This may allow more processing resources to be dedicated to other actions, if needed.

Entry storer 306 is then configured to store an entry for the packet drop. In one embodiment, the entry is flow specific. That is, the flow in which the packet is dropped is determined. An entry may provide information on the flow and also a context on why the packet was dropped. For example, the entry may be a 6-tuple that includes the source IP address, destination IP address, source port (if any), destination port (if any), packet drop reason, and packet drop count. If the packet dropped contains a higher layer payload other than TCP/UDP, then a higher layer protocol number can be used in the source port field and the destination port may take the value of zero.

The packet drop reason may be a code for the reasons enumerated above. For example, if a buffer full condition exists where the input buffer is full, then the code 1A may be used. It will be recognized that any codes may be used to provide the packet drop reason.

The packet drop count may be the number of packets that have been dropped that include the same information in the fields. For example, if an entry already exists with the same fields for the source IP address, destination IP address, source port, destination port, and packet drop reason, then the packet drop count for an already existing entry is incremented rather than creating a new entry. Accordingly, storage may be saved if packet drops are being dropped for the same flow for the same reason.

Entry storer 306 then stores the entry in entry storage 308. Entry storage 308 may be a buffer, database, or any other storage.

Entry exporter 310 is configured to export the entries from storage 308 to aggregation device 104. Entry exporter 310 may perform the exports at certain time intervals or after a threshold is reached. Also, entry exporter 310 may pack multiple entries into the same packet for scaling. This allows entry exporter 310 to send entries for multiple flows. Also, entry exporter 310 may use a reliable protocol to insure that the exported information is not lost.

Figure 4:
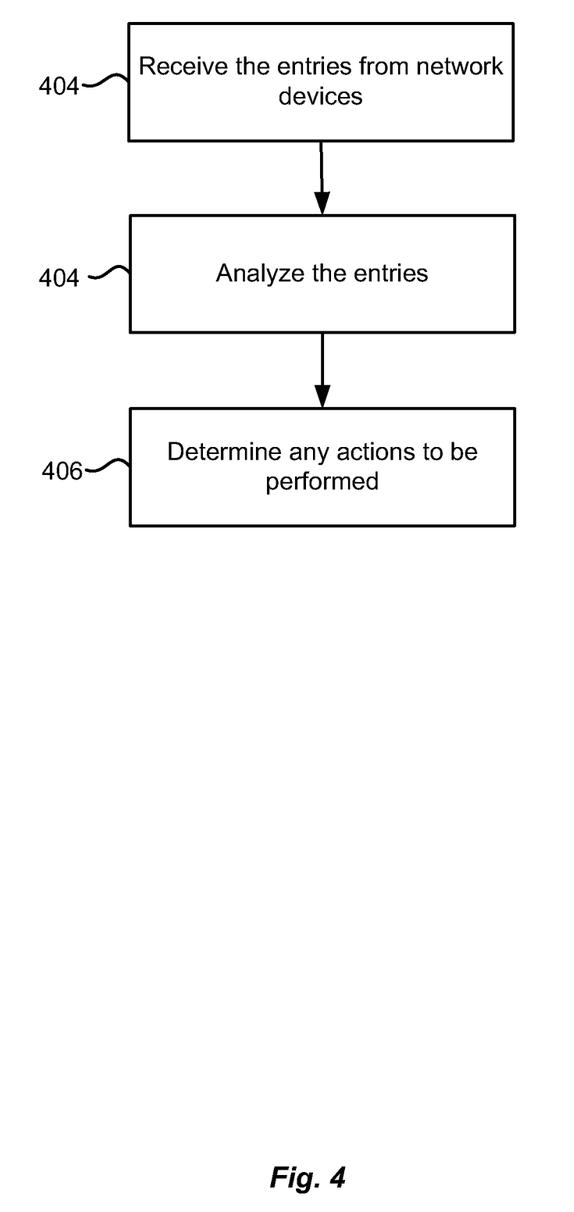
FIG. 4 depicts an example of a method for performing analysis of the packet drops.

Once the entries are received at aggregation network device 104, different actions may be taken. FIG. 4 depicts an example of a method for performing analysis of the packet drops. Step 402 receives the entries from network devices 102. For example, entries from different network devices 102 may be received. An analysis for specific network devices 102 and also across multiple network devices 102 may be provided.

Step 404 then analyzes the entries. The entries may be analyzed on a per network device basis, across multiple network devices, or on a per flow basis.

Aggregation network device 104 may provide a consolidated view of all packet drops. In one embodiment, the entries may be checked against different traffic policies. Protocol incompliance can be related to a breach of security where applicable and appropriate actions were taken to contain the number of protocol incompliance situations. Output/input buffer drops may be monitored and can help network administrators take appropriate corrective actions, such as adding additional hardware buffer resources required to avoid packet drops or to fine-tune traffic shaping configurations, etc. Also, queuing related drops can be analyzed to determine if queuing is actually dropping low business priority traffic and not dropping business critical traffic. Policy incompliance-related drops can also be examined at the network layer to cross-check policy compliance.

Step 406 then determines any actions to be performed. The actions to be performed may include any of the above troubleshooting actions. Further, actions may include generating reports for a network administrator to analyze. Further, recommended troubleshooting actions can be outputted.

The troubleshooting may be provided for a specific packet flow. This may be important when certain flows are business critical. This may improve customer service as the flow may be analyzed. This is different when just a general packet drop counter is used. In this case, flow-specific information is saved and exported to aggregation network device 104. Thus, the reason why packets are being dropped at a specific flow may be determined.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
   determining, using a network node, that a first packet has been dropped for a flow of packets between a source and a destination, the network node being in a path between the source and the destination and configured to forward packets for the flow between the source and the destination;

determining, using the network node, a first context information related to a first possible cause of the first packet being dropped after the packet is dropped, wherein the first context information comprises a packet drop reason for a first possible cause of the first packet drop, and information for a time when the first packet was dropped;

determining identification information for the flow that is associated with the first packet, wherein the identification information identifies the flow;

generating an entry for the first packet drop, the entry including the first context information, the identification information for the flow and a running count associated with the identification information;

sending the entry, using the network node, to a network device that is configured to analyze, based on the context information and identification information included in the entry, one or more actual causes for the first packet drop for the flow identified by the identification information in the entry;

determining a packet drop count that is associated with the flow and the packet drop reason; and incrementing the packet drop count.

2. The method of claim 1, further comprising:

determining that a second packet has been dropped for the flow of packets between the source and the destination;

determining a second context information related to the second packet being dropped, wherein the second context information includes a packet drop reason for a second possible cause of the second packet drop; and generating a second entry including the second context information and the identification information for the flow, wherein the first context information and the second context information enable the network device to analyze whether the second packet drop for the flow is related to the first packet drop.

3. The method of claim 2, further comprising:

determining whether the first possible cause and the second possible cause are related to a same possible cause; and based on determining that the first possible cause and the second possible cause are related to a same possible cause, incrementing the running count by one.

4. An apparatus comprising:

one or more computer processors; and logic encoded in one or more tangible storage media for execution by the one or more computer processors and when executed operable to:

determine that a first packet has been dropped for an flow of packets between a source and a destination, the apparatus being in a path between the source and the destination and configured to forward packets for the flow between the source and the destination;

determine a first context information related to a first possible cause of, the first packet being dropped after the packet is dropped, wherein the first context information comprises a packet drop reason for a first possible cause of the first packet drop, and information for a time when the first packet was dropped;

determine identification information for the flow that is associated with the first packet;

generate an entry for the first packet drop, the entry including the first context information, the identification information for the flow and a running count associated with the identification information;

send the entry to a network device that is configured to analyze, based on the context information and identification information included in the entry, one or more actual causes for the first packet drop for the flow identified by the identification information in the entry;

determine a packet drop count that is associated with the flow and the packet drop reason; and increment the packet drop count.

5. The apparatus of claim 4, wherein the logic when executed is configured to cause at least one processor to:

determine that a second packet has been dropped for the flow of packets between the source and the destination;

determine a second context information related to the second packet being dropped, wherein the second context information includes a packet drop reason for a second possible cause of the second packet drop; and generate a second entry including the second context information and the identification information for the flow, wherein the first context information and the second context information enable the network device to analyze whether the second packet drop for the flow is related to the first packet drop.

6. The apparatus of claim 5, wherein the logic when executed is configured to cause at least one processor to:

determine whether the first possible cause and the second possible cause are related to a same actual cause; and based on determining that the first possible cause and the second possible cause are related to a same actual cause, increment a reason counter for the same actual cause that is associated with the flow related to the identification information.

7. An apparatus comprising:

means for determining that a packet has been dropped for an flow of packets between a source and a destination, the apparatus being in a path between the source and the destination and configured to forward packets for the flow between the source and the destination; and a processor configured to:

determine a first context information related to a first possible cause of the first packet being dropped after the packet is dropped, wherein the first context information comprises a packet drop reason for a first possible cause of the first packet drop, and information for a time when the first packet was dropped;

determine identification information for the flow that is associated with the first packet;

generate an entry for the first packet drop, the entry including the first context information, the identification information for the flow and a running count associated with the identification information;

send the entry to a network device that is configured to analyze, based on the context information and identification information included in the entry, one or more actual causes for the packet drop for the flow identified by the identification information in the entry;

determine a packet drop count that is associated with the flow and the packet drop reason; and increment the packet drop count.

8. An apparatus comprising:

means for receiving an entry, the entry including context information for a packet drop, identification information and a running count associated with the identification information at a network device for a flow of packets from a source to a destination, the network device being in a path between the source and the destination and configured to forward packets for the flow between the source and the destination;

a processor configured to identify the flow of packets using the identification information included in the entry;

a memory configured to store the context information for the packet drop and the running count, wherein the processor is configured to associate the stored context information with the flow using the identification information included in the entry, wherein the context information comprises a packet drop reason for a first possible cause of the first packet drop and information for a time when the packet was dropped, and wherein the processor is configured to analyze, based on the stored context information for the flow, one or more actual causes for the packet drop; and a processor configured to determine a packet drop count that is associated with the flow and the packet drop reason and to increment the packet drop count.

9. The method of claim 1, wherein the identification information comprises a source address and a destination address.

10. The method of claim 1, wherein the identification information is included in a tuple that includes a source IP (Internet Protocol) address, a destination IP address, a source port, a destination port, the packet drop reason, and the packet drop count.

11. The method of claim 1, further comprising storing the entry at the network node for later delivery to a packet analyzer.

12. The method of claim 1, wherein the actual cause includes a reason from a plurality of categories describing reasons for why the first packet is dropped, the plurality of categories comprising:

the network device not possessing enough resources to receive or re-send the first packet, and the network device determining that the first packet received violates a policy configured on the network device.

13. The method of claim 1, wherein the actual cause includes a reason from a plurality of categories describing reasons why the packet is dropped, the plurality of categories comprising:

rules included in protocol definitions that are not satisfied, and a control plane protocol reconvergence.

14. The method of claim 1, further comprising:

in response to an analysis by the network device, determining at least one troubleshooting action that is to be performed for the flow.

15. The method of claim 14, wherein the at least one troubleshooting action comprises an action to contain a number of protocol incompliance situations associated with a breach of network security.

16. The method of claim 14, wherein the at least one troubleshooting action comprises an action adding additional hardware buffer resources at a network node to avoid packet drops or to fine-tune traffic shaping configurations.

* * * * *